(No Model.)

R. B. DALY.
Carding Machine.

No. 240,669. Patented April 26, 1881.

WITNESSES.
L. F. Connor.
Arthur Reynolds

INVENTOR.
Richard B. Daly
by Crosby & Gregory
Attys.

UNITED STATES PATENT OFFICE.

RICHARD B. DALY, OF NEWTON UPPER FALLS, ASSIGNOR OF ONE-HALF TO HENRY BILLINGS, OF NEWTON, MASSACHUSETTS.

CARDING-MACHINE.

SPECIFICATION forming part of Letters Patent No. 240,669, dated April 26, 1881.

Application filed December 17, 1880. (No model.)

*To all whom it may concern:*

Be it known that I, RICHARD B. DALY, of Newton Upper Falls, county of Middlesex, and State of Massachusetts, have invented a new and useful Improvement in Carding-Machines, of which the following description, taken in connection with the accompanying drawings, is a specification.

This invention relates to improvements on that class of carding-machines represented in United States Patent No. 166,089, July 27, 1875, to which reference may be had, and has especial reference to the means employed for supporting the under-flats and adjusting them on the side frames of the carding-engine, whereby the proper position of the under-flats with relation to the carding-cylinder may be maintained, and the force of the springs holding them pressed toward the said cylinder be made more or less at will.

In this my invention I have supported the under-flats upon screw-threaded headed guide-rods inserted in threaded nuts made movable in guideways toward and from the axis of the carding-cylinder, the said nuts being acted upon by the spiral springs on the guide-rods to keep the under-flats in place.

Figure 1:
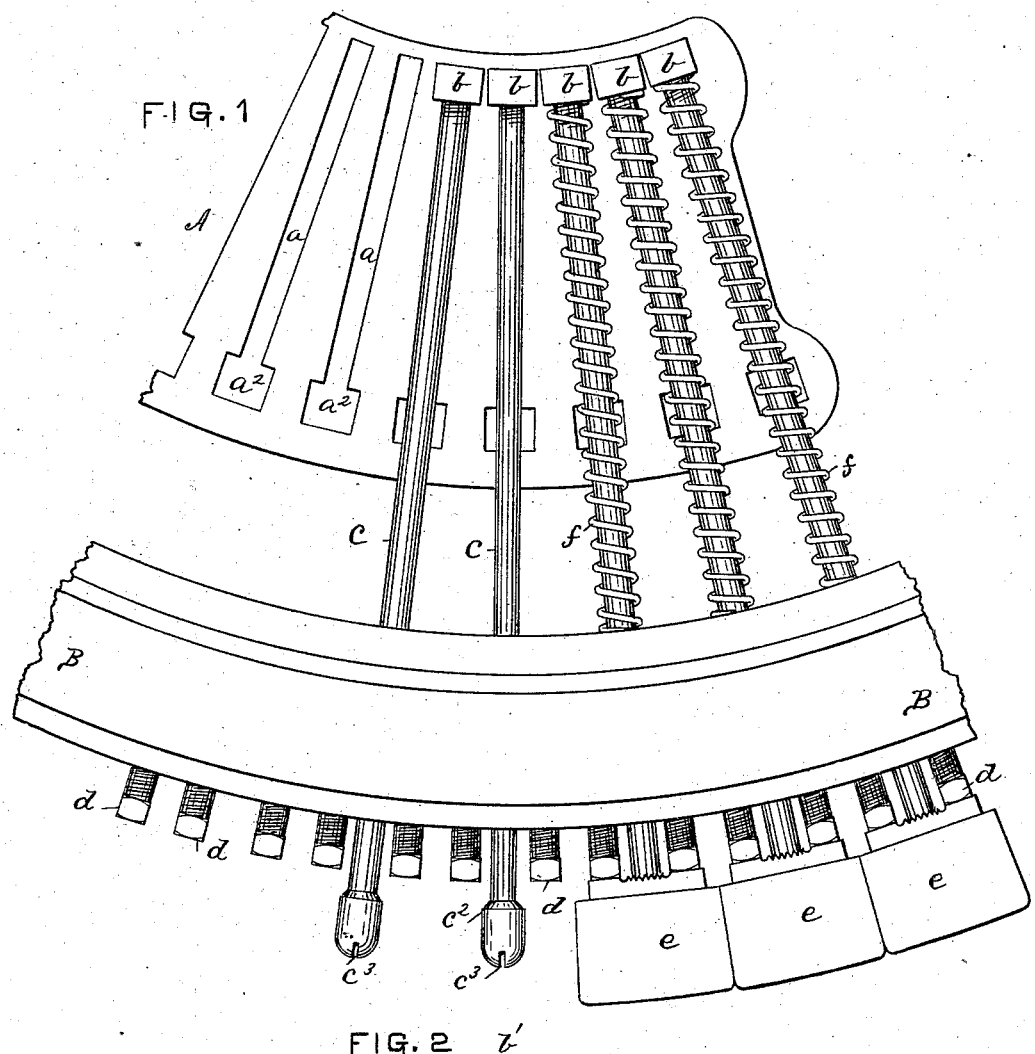
Figure 2:
Figure 3:
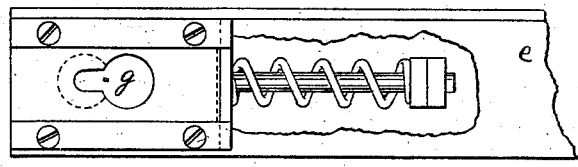

Figure 1 of drawings represents, in side elevation, a sufficient portion of the frame-work of a carding-machine, taken in connection with the said patent referred to, to illustrate my present invention. Fig. 2 represents one of the guided nuts detached, and Fig. 3 is a detail to be referred to.

The segmental piece A, of metal, forms part of or is connected with the side frame of the carding-engine, there being one such piece A at each end of the card-cylinder, the said pieces extending about or across the ends of the said cylinder as far as it is desired to extend the series of so-called "under-flats." This plate A is provided with a series of radial slots, $a$, each having at its lower end an enlarged space or opening, $a^2$, to permit the insertion therein of one of the guided nuts, $b$, properly threaded, and provided at its sides with grooves $b'$, to fit the edges of the plate A at each side of a slot, $a$, when the nut is placed in the said slot, the said edges guiding the said nuts and preventing their removal from the plate A, except when in the opening $a^2$.

The arch B, constituting part of the stationary frame-work of the usual carding-engine, (there being such an arch at each side of the carding-cylinder,) is provided with holes to receive the guide-rods $c$, and has screwed into it the series of adjustable flat leveling-screws $d\,d$, there being two such screws at the opposite sides of the frame-work for each end of each under-flat $e$, their position determining the nearness of the card-clothed surface of the under-flat with relation to the card-clothed surface of the carding-cylinder.

The guide-rod $c$ has shoulder-heads $c^2$, to properly support the ends of the under-flats.

Each under-flat has at each end a slotted plate with an eye, shaped as at $g$, Fig. 3, and one of the said plates is held by a spring, so as to be moved horizontally to effect the proper holding and releasing of the under-flats, all as described in the said patent, and particularly in the reissue thereof, No. 7,399, November 28, 1876.

The device shown in Fig. 3 of this application as secured to the under-flat at one end to support it on the guide-rod is but a duplication of the device, Fig. 3, in the patent referred to, and it is herein employed for the same purpose.

The ends of the under-flats having been properly placed upon and so as to be supported by the heads $c^2$ of the guide-rods $c$, the latter are extended through spiral springs $f$, one for each guide-rod, and are then screwed into the nuts $b$. These springs, seated at their lower ends upon the arch B, act at their upper ends upon the nuts $b$ and force them upward in the slots $a$, drawing the under-flats up firmly with them closely against the heads of the screws $d$. The under-flats, held up in this way by the springs $f$, may be moved down or away from the heads of the said screws $d$ and usual carding-cylinder when it is desired to strip the under-flats, the springs being compressed as the flats are drawn away from the carding-cylinder.

Should the springs become weakened in any way by wear or lose their force, it is only necessary to insert a screw-driver in the slots $c^3$ in the heads $c^2$ and turn the guide-rods farther into the nuts $b$, such action drawing the nuts $b$ down upon the guide-rods, compressing the said spring $f$ and adding to their force.

In the said patented machine each guide-rod, at its upper end, is flattened to enter a slot in a rim, the rod being thus prevented from rotating, and below this rim each rod has attached to it by a screw a small collar, which serves as a seat for the upper end of the spring on the said guide-rod, the lower end of the said spring being supported on an arch, and in practice the lower end of each rod has been provided with an adjustable shouldered nut to bear against the outer side of the under-flat. These small collars on the guide-rods, held in place by set-screws, are apt to get loose and release the force of the springs, so that they do not promptly draw the under-flats up after they have been stripped and are struck by the automatic stripper, to the great injury of the latter.

The screw-threads on the guide-rods in this my application, they entering the nuts, form connections which cannot become loose, so as to permit the guide-rods to slide or relax the force of the springs thereon, except by special and intended manipulation.

I claim—

The radially-slotted plate A, the arch B, under-flats, spiral springs, and headed screw-threaded guide-rods, combined with the guide-nuts $b$, into which the rods are screwed, the guide-nuts being placed in the slots in the said plate, to operate substantially as described.

In testimony whereof I have signed my name to this specification in the presence of two subscribing witnesses.

RICHARD B. DALY.

Witnesses:
G. W. GREGORY,
BERNICE J. NOYES.